United States Patent
Greenan et al.

Patent Number: 6,044,645
Date of Patent: Apr. 4, 2000

[54] FLOW CONTROL FOR OIL IN TRANSIT

[75] Inventors: Edward J. Greenan, Belleville; Bruce T. Levy, Howell; Tsunlock Andrew Yu, Saline; Alan Lee Brace, Livonia, all of Mich.

[73] Assignee: General Motors Corporation, Detroit, Mich.

[21] Appl. No.: 09/130,074

[22] Filed: Aug. 7, 1998

[51] Int. Cl.[7] .................................................. F16D 33/00
[52] U.S. Cl. ................................................ 60/337; 60/339
[58] Field of Search ........................... 60/329, 337, 339

[56] References Cited

U.S. PATENT DOCUMENTS

| | | | |
|---|---|---|---|
| 2,837,285 | 6/1958 | Urban | 60/329 X |
| 3,053,051 | 9/1962 | Kelley | 60/329 |
| 3,315,464 | 4/1967 | Hayden | 60/329 |
| 3,951,242 | 4/1976 | Fischer et al. | 60/337 X |
| 4,680,928 | 7/1987 | Nishikawa et al. | 60/329 |
| 4,970,860 | 11/1990 | Mezger et al. | 60/337 |
| 5,513,732 | 5/1996 | Goates | 192/3.3 |
| 5,700,226 | 12/1997 | Droste | 477/156 |
| 5,762,134 | 6/1998 | Droste et al. | 60/337 X |
| 5,890,509 | 4/1999 | Becker et al. | 60/329 X |

*Primary Examiner*—John E. Ryznic
*Attorney, Agent, or Firm*—Dean L. Ellis; Michael J. Bridges

[57] ABSTRACT

A power transmission has a hydraulic control from which oil is distributed to various transmission components, a cooler and reservoir. A flow direction control valve is disposed in the distribution system to direct oil in transit to the reservoir during cold operation and to a transmission lubrication circuit or cooling circuit during normal operating temperatures.

5 Claims, 2 Drawing Sheets

FLOW CONTROL FOR OIL IN TRANSIT

TECHNICAL FIELD

This invention relates to transmission hydraulic systems, and more particularly, to flow control valves for maintaining a desired reservoir level by directing oil in transit to proper locations.

BACKGROUND OF THE INVENTION

In power transmissions, a oil reservoir or sump is provided from which a pump draws fluid for delivery to various components within the transmission. The pump sends the fluid to a valve body which distributes the fluid under various pressures to a torque converter and to various transmission components as well as directing oil to a transmission oil cooler.

The transmission oil cooler returns the fluid to the transmission cross section lubrication system wherein various bearings and other rotating devices are lubricated. The transmission sump must contain enough oil to maintain the pump inlet covered and account for transmission oil in transit between the oil cooler and the transmission sump. That is, the oil directed to the lubrication circuit becomes oil in transit once the transmission is put in operation thereby reducing the level of the oil in the sump. Thus, the initial sump fill must be at a sufficient level to account for the in transit oil and maintain the pump inlet covered at all times.

In transit, oil volume is very large at cold temperatures due to the viscosity of the oil. As temperature increases, oil volume in transit decreases as viscosity decreases, thereby increasing oil level in the sump. In prior art devices, this increase in volume is normally accommodated by a secondary storage reservoir or by making the original reservoir sufficiently deep thereby making room for oil expansion.

SUMMARY OF THE INVENTION

It is an object of the present invention to provide an improved oil handling system in a power transmission which will accommodate in transit oil flow.

In one aspect of the invention, a large portion of the in transit cold oil in the system is returned directly to the reservoir or pump inlet through a thermal flow control valve.

In another aspect of the invention, the thermal flow control valve directs oil, in the normal operating temperature range, for delivery to the transmission lube circuit.

In yet another aspect of the invention, the thermal flow control valve directs cold oil from the transmission torque converter through the reservoir in bypass relation with the transmission oil cooler.

In a further aspect of the invention, a restricted bypass passage is provided to ensure a minimum constant flow of lubrication oil is directed to the transmission lube circuit.

An oil pump delivers oil to a valve body for distribution to various transmission components such as a torque converter, clutches and brakes. The majority of in transit oil returning from the torque converter is directed to a thermal valve. The thermal valve directs the oil to the transmission reservoir when the oil temperature is below a predetermined value and directs the return oil for delivery to a transmission lubrication circuit when the oil temperature is at or above a predetermined value.

In one embodiment of the invention, the in transit oil from the torque converter is passed through an oil cooler prior to the thermal valve. A minimum flow of oil is delivered to the system lubrication circuit through a restricted bypass passage disposed upstream in bypassing relationship with the thermal valve.

DESCRIPTION OF EXEMPLARY EMBODIMENTS

Figure 1:
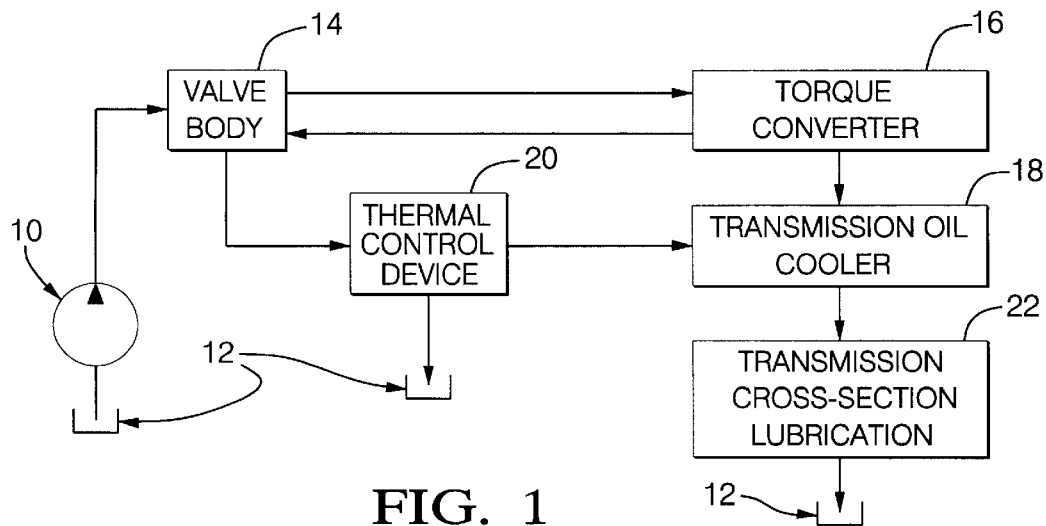
FIG. 1 is a diagrammatic view of an oil delivery system in power transmission incorporating one embodiment of the invention.

Referring to the drawings, there is seen in FIG. 1 a positive displacement pump 10 which draws oil from a reservoir 12 for delivery to a transmission valve body 14. The valve body 14 is constructed in accordance with the well known valve systems utilized in power transmissions. The valve body has numerous valves which direct the fluid to the desired components.

In FIG. 1, the valve body 14 directs fluid to a conventional torque converter 16, which after utilizing the fluid or oil, return the majority of the oil to the valve body 14 while a small amount of leakage is directed to a transmission oil cooler 18. The valve body 14 directs the valve return from the torque converter 16 to a thermal control valve 20 which is effective to return some or all of the oil to the reservoir 12 when the oil is below a predetermined temperature and to the transmission oil cooler 14 when the oil is above a predetermined temperature. The oil cooler 18 directs fluid to a transmission cross section lubrication system or circuit 22 wherein bearings and other rotating and sliding devices are lubricated by this fluid.

With this system, the in transit oil, that is, the oil traveling between the valve body and the transmission cross section lubrication circuit 22 is controlled such that the oil is returned to the reservoir 12 when the temperature is below a predetermined value. This maintains the oil in transit at the transmission oil cooler and transmission cross section at a minimum value while maintaining the oil level in the reservoir 12 at a maximum value. The higher level of oil within the reservoir 12 ensures that the inlet to the pump 10 will be under the oil level and thereby prevent cavitation of the pump 10.

Figure 2:
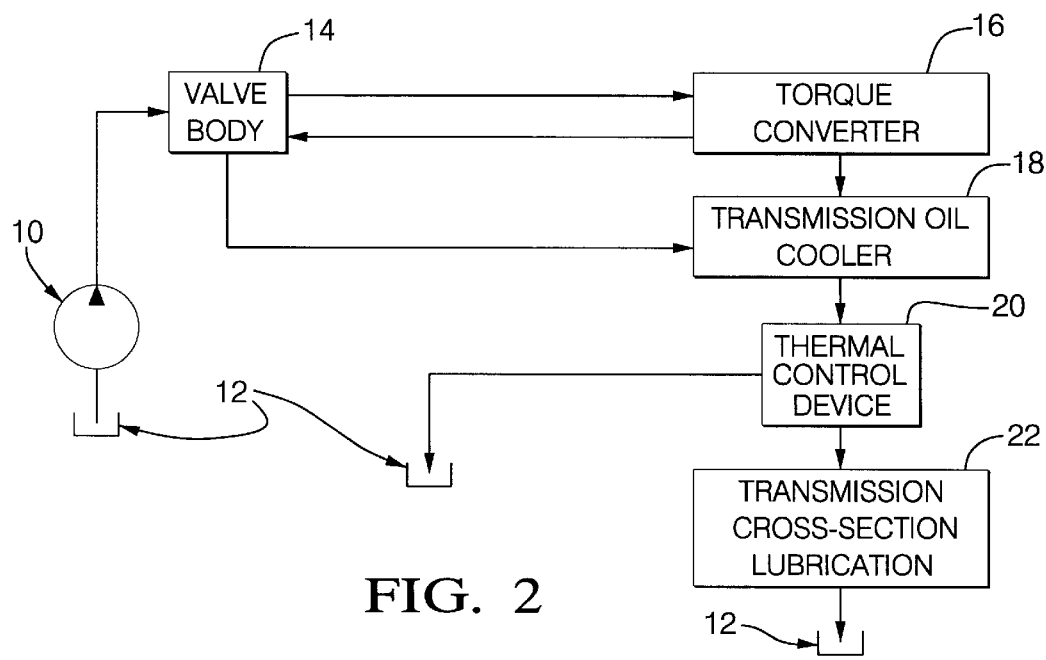
FIG. 2 is a diagrammatic view of an oil delivery system in a power transmission incorporating another embodiment of the invention.

The oil system shown in FIG. 2 includes a positive displacement pump 10, a valve body 14, a torque converter 16, an oil cooler 18, a thermal control device 20 and a transmission cross section lubrication circuit 22 and a reservoir 12. In the fluid oil system shown in FIG. 2, the thermal control valve 20 is disposed between the oil cooler 18 and the transmission cross section lubrication circuit 22 such that the oil is returned to the reservoir 12 until the oil received at the thermal control valve 20 is at or above a predetermined temperature. In FIG. 2, as with FIG. 1, this permits the in transit oil at the transmission cross section lubrication circuit to be maintained at a minimum value while the reservoir oil level is retained at a maximum value.

Figure 3:
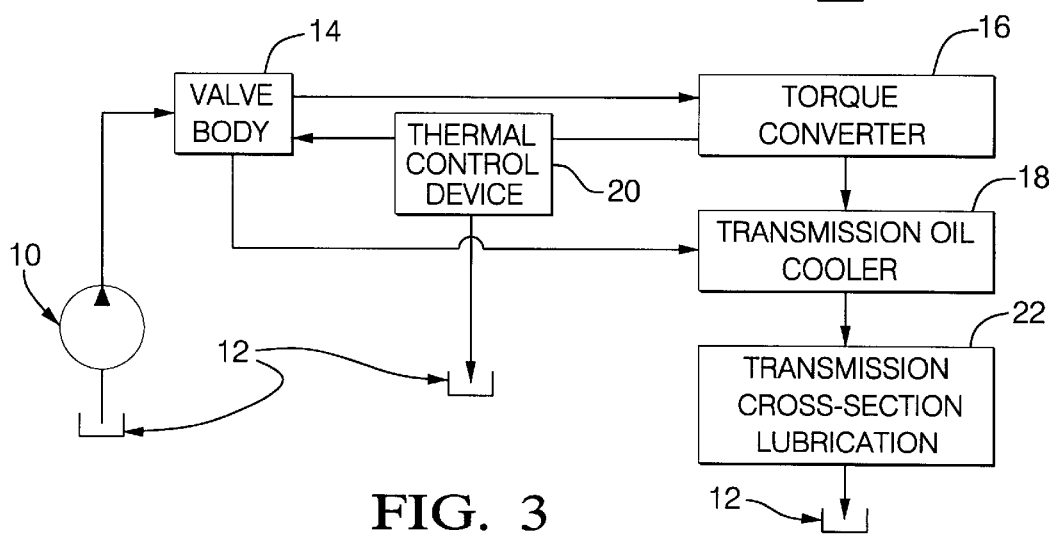
FIG. 3 is a diagrammatic view of an oil delivery system in a power transmission incorporating a further embodiment of the invention.

The hydraulic circuit shown in FIG. 3 includes the same components as those described above for FIGS. 1 and 2, that is, a pump 10, a reservoir 12 a valve body 14, a torque converter 16, a thermal control valve 20, a transmission oil cooler 18 and a transmission cross section lubrication circuit 22. In the embodiment shown in FIG. 3, the thermal control valve 20 is disposed between the torque converter 16 and the valve body 14 such that the oil in transit from the torque converter is directed immediately to the reservoir 12 when the oil temperature is below a predetermined value. This further limits the amount of oil that would be in transit between the pump 10 and the transmission cross section lubrication circuit 22.

As described above, the thermal control valve 20 will direct the warm transmission oil through the valve body 14 to the transmission cooler 18 from which it is distributed to the transmission cross section 22 for lubrication.

When the transmission oil achieves the temperature such that the thermal control valve 20 distributes the majority of the fluid to the transmission cross section lubrication circuit 22, this reduces the amount of oil immediately received in the reservoir, since it is placed in transit between the thermal control device and the reservoir by way of the transmission cross section. Thus, as the oil increases in temperature, the oil level within the reservoir does not increase as rapidly as it would without the present invention.

Figure 4:
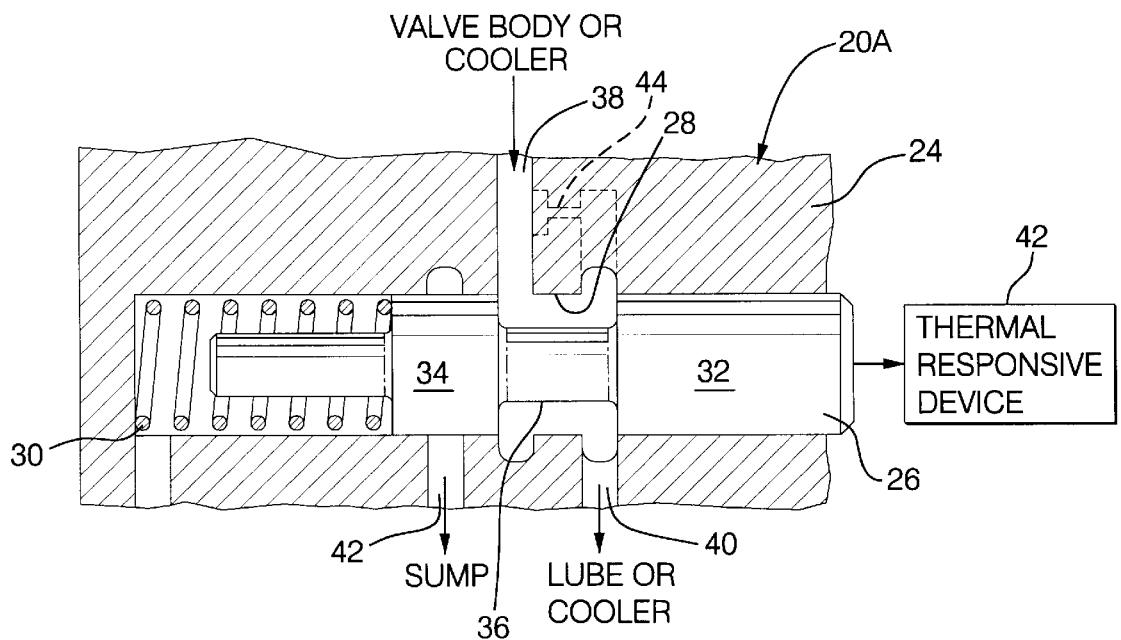
FIG. 4 is a sectional elevational view of a thermal flow control valve which may be used in FIGS. 1 through 3.

In FIG. 4, there is seen a thermal control valve 20A disposed in a body or housing 24, which may, if desired, be a part of the valve body 14. However, the location of the valve 20A within the hydraulic circuit will determine the type of housing 24 that is utilized.

The valve 20A includes a valve spool 26 which is slidably disposed in a valve bore 28 and is urged in one direction by a bias spring 30.

The valve spool 26 has spaced lands 32 and 34 which have a valley 36 disposed therebetween to direct fluid between numerous ports. The housing 24 has an inlet port 38 which receives hydraulic oil from the valve body 14, as seen in FIG. 1, the transmission oil cooler 18, as seen in FIG. 2, or the torque converter as seen in FIG. 3.

The valve spool 26 is shown in the spring set position which would indicate that the hydraulic oil is at the proper operating temperature or within the proper operating range. The valve lands 32 and 34 direct the oil from the inlet port 38 to an outlet port 40 which communicates with the transmission cooler 18, as shown in FIG. 1, the transmission cross section lubrication circuit 22, as shown in FIG. 2, or the valve body 14, as shown in FIG. 3.

A thermally responsive device 42, such as an expandable spring member or a wax piston member, or an electro-hydraulic device with a controller connected with a temperature sensor, is effective to urge the valve spool 26 leftward against the spring 30 when the temperature of the oil is below a predetermined value. When the oil temperature is sufficiently low, as will be normal at vehicle start-up, the valve lands 32 and 34 are effective to close the outlet port 40 and open an outlet port 42 which, as seen in FIGS. 1, 2 and 3 is connected to the transmission reservoir 12.

Also constructed in the valve body or housing 24, is a bypass restriction 44 which will permit oil coming to the inlet 38 to bypass the valve spool valley 36 when the valve spool is in the cold or leftward position, thereby permitting a minimum amount of oil to flow directly to the lube circuit or cooler circuit depending how the outlet 40 of valve 20A is connected. This will ensure a minimum of lubrication fluid for the various parts within the transmission.

Those skilled in the art will also recognize that the transmission system does have other leakage points, particularly in the valve body and in the various clutches and brakes which fluid is connected directly or indirectly into the transmission lubrication circuit and this oil is always available for transmission lubrication.

Figure 5:
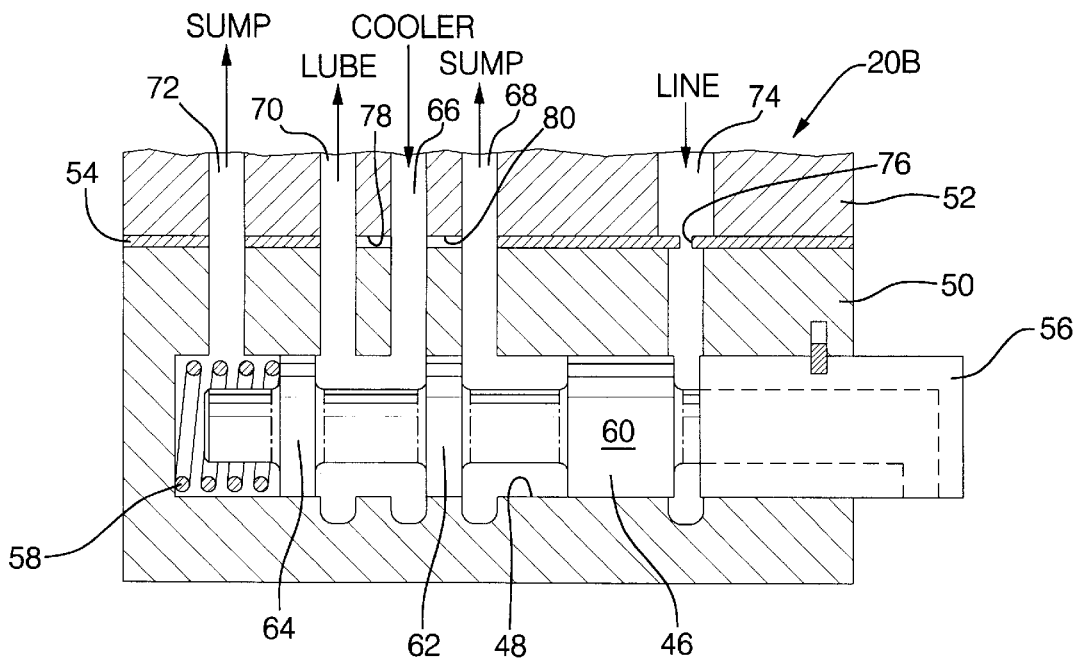
FIG. 5 is a sectional elevational view of another thermal flow control valve which may be used in FIGS. 1 through 3.

In FIG. 5, there is shown a thermal valve 20B which has a valve spool 46 slidably disposed in a valve body 48 formed in a housing 50. The housing 50 is connected to a housing 52 with a gasket or separator plate 54 sandwiched therebetween. The valve 20B also includes a thermal responsive device 56 which is effective to urge the valve spool 46 leftward against a bias spring 58 when the oil temperature is below a predetermined value.

The valve spool 46 has three spaced lands 60, 62 and 64 which control fluid flow from an input port 66 to a pair of output ports 68 and 70. The housing 52 also has a port 72 which is connected directly to reservoir 12.

The separator plate 54 has a restriction 76 formed therein which permits a small amount of fluid from a line passage 74 to pass through the thermal responsive device 56 such that the oil temperature can be readily sensed thereby. The separator plate 54 also has openings at 78 and 80 which permit fluid communication between ports 66 and 70 and ports 66 and 68, respectively.

In the spring set or warm position shown, fluid is directed to the inlet port 66. From there the fluid passes between valve lands 62 and 64 to the outlet port 70 which eventually communicates with the transmission cross section lubrication circuit 22. The thermal device 56 will, when the oil is cold, move the valve spool 46 leftward against the spring 58 such that the land 62 will close the connection between the ports 66 and 70 while simultaneously opening a connection between the ports 66 and 68. When the valve spool 46 is in the thermal device set position, the oil at the inlet port 66 is communicated directly back to the reservoir 12.

When the valve is in the leftward position or thermal set position, the opening 78 permits a minimum amount of oil to flow from the inlet port 66 to the outlet port 70 thereby ensuring a minimum amount of flow of oil to the transmission cross section lubrication circuit.

We claim:

1. An oil system in a power transmission comprising:

a reservoir;

an oil pump for drawing oil from said reservoir and delivering the oil to a valve system in said transmission; said valve body being controlled to deliver the oil to a torque converter;

a thermal flow control valve directing at least a portion of said oil returning from said torque converter directly to said reservoir when the oil has a temperature below a predetermined value and directing the oil to a lubrication circuit for other components of the transmission when the oil has a temperature at or above the predetermined temperature.

2. The oil system defined in claim 1 wherein:

the oil from said thermal flow control valve passes through an oil cooler prior to delivery to the lubrication circuit for the other components.

3. The oil system in a power transmission defined in claim 1 wherein:

the oil directed to the thermal flow control valve passes through an oil cooler upstream of the thermal control valve.

4. The oil system in a power transmission defined in claim 1 further comprising:

a restricted oil flow passage upstream of said thermal flow control valve directing a small amount of the oil to bypass the thermal flow control valve for delivery to the lubrication circuit.

5. An oil system in a power transmission comprising:

a reservoir;

an oil pump for drawing oil from said reservoir and delivering the oil to a valve system in said transmission; said valve body being controlled to deliver the oil to a torque converter;

a thermal flow control valve directing at least a portion of said oil returning from said torque converter to said reservoir when the oil has a temperature below a predetermined value and directing the oil to a lubrication circuit for other components of the transmission when the oil has a temperature at or a above the predetermined temperature; and the oil directed to the thermal flow control valve passes through an oil cooler upstream of the thermal flow control valve.

* * * * *